(12) United States Patent
Pickering

(10) Patent No.: US 9,277,054 B2
(45) Date of Patent: Mar. 1, 2016

(54) APPARATUS AND METHOD FOR INTEGRATING COMPUTER-TELEPHONY AND SEARCH TECHNOLOGY

(75) Inventor: Richard B. Pickering, Basingstoke (GB)

(73) Assignee: NewVoiceMedia Ltd., Basingstoke (GB)

( * ) Notice: Subject to any disclaimer, the term of this patent is extended or adjusted under 35 U.S.C. 154(b) by 1500 days.

(21) Appl. No.: 12/376,269

(22) PCT Filed: Apr. 17, 2007

(86) PCT No.: PCT/GB2007/001398
§ 371 (c)(1),
(2), (4) Date: Mar. 22, 2010

(87) PCT Pub. No.: WO2008/015373
PCT Pub. Date: Feb. 7, 2008

(65) Prior Publication Data
US 2010/0202603 A1 Aug. 12, 2010

(30) Foreign Application Priority Data

Aug. 4, 2006 (GB) .................................. 0615533.7

(51) Int. Cl.
*H04M 3/00* (2006.01)
*H04M 3/51* (2006.01)
(Continued)

(52) U.S. Cl.
CPC ........ *H04M 3/5191* (2013.01); *H04M 3/42068* (2013.01); *H04M 3/493* (2013.01); *H04M 3/4931* (2013.01)

(58) Field of Classification Search
CPC . H04M 3/5175; H04M 3/5183; H04M 3/487; H04M 3/4931

USPC .............................. 379/201.02, 218.01, 93.17
See application file for complete search history.

(56) References Cited

U.S. PATENT DOCUMENTS

| 6,167,395 | A  | * | 12/2000 | Beck .................. G06F 17/30017 |
| 6,760,727 | B1 | * | 7/2004  | Schroeder ............. G06Q 30/02 |
| 7,711,745 | B2 | * | 5/2010  | Richartz et al. ............... 707/770 |

(Continued)

FOREIGN PATENT DOCUMENTS

| WO | 0007135 A1 | 2/2000 |
| WO | 0054485 A1 | 9/2000 |

(Continued)

OTHER PUBLICATIONS

Meng, Weiyi et al., "Building Efficient and Effective Metasearch Engines", ACM Computing Surveys, vol. 34, No. 1, Mar. 2002, pp. 48-89, XP-002284747, ISSN 0360-0300.

(Continued)

*Primary Examiner* — Amal Zenati
(74) *Attorney, Agent, or Firm* — Galvin Patent Law LLC; Brian R. Galvin

(57) ABSTRACT

Call center, automatic call distribution (ACD), with computer telephony integration (CTI) providing a search engine that is automatically fed with the calling line identifier (CLI) such that a search can be performed to find related documents, emails, URLs using private or public databases that may be accessed for free or only after having paid a subscription. The application also mentions that the system can be applied to outgoing calls in which case the dialed number is used for performing the search.

7 Claims, 6 Drawing Sheets

(51) Int. Cl.
*H04M 3/42* (2006.01)
*H04M 3/493* (2006.01)

(56) References Cited

U.S. PATENT DOCUMENTS 8,472,606 B2 * 6/2013 Helbling .............. H04M 3/387
379/218.01
2004/0008828 A1 1/2004 Coles

FOREIGN PATENT DOCUMENTS

| WO | 2004114147 | A1 | 12/2004 |
| WO | 2005017773 | A2 | 2/2005 |
| WO | 2005020103 | A1 | 3/2005 |

OTHER PUBLICATIONS

"Telephony Managament: Bendata's Heat Telephony Manager Integration Provides Service Organizations with Window to Incoming Calls", Edge, on and about AT&T, vol. 2, No. 17, Mar. 1997, pp. 1-2, XP002925021 the whole document.

* cited by examiner

APPARATUS AND METHOD FOR INTEGRATING COMPUTER-TELEPHONY AND SEARCH TECHNOLOGY

FIELD OF THE INVENTION

The invention relates to the integration of computer-telephony and search technology.

BACKGROUND OF THE INVENTION

FIG. 1 is an illustration of a conventional computer-telephony integration (CTI) system. An incoming call 60 is received by a switch 90. The switch passes information about the call to a CTI server 80. The information passed may include, for example, the calling line identification (CLI), sometimes known as automatic number identification (ANI), and/or the dialed number identification. Switch 90 may also be provided with an additional facility, such as an interactive voice response (IVR) unit (not shown in FIG. 1) to obtain additional information from the caller, for example an account number or such like. This additional information may also be passed to CTI server 80.

The switch 90 routes the call through the telephone network 101 to a telephone 121 belonging to an agent 120. For example, the switch may route a particular incoming call 60 to agent 120B having telephone 121B. The CTI server 80 may instruct the switch 90 to which particular agent the incoming call should be forwarded. Alternatively, the switch 90 may make this decision through some other mechanism, such as agent availability (and may notify the CTI server 80 accordingly).

In addition to telephone 121, each agent 120 is also provided with a workstation 122. The CTI server 80 has access to a customer relationship management (CRM) database 70. Note that although CRM database 70 is shown in FIG. 1 as a single system, it may comprise multiple databases and/or systems spread across an enterprise. The CTI server 80 can use information about a particular call provided by switch 90 to look up information relating to the caller in the CRM database 70. For example, this information may represent the name and address of a party associated with a particular calling line identification, as well as information about previous orders made by this person, etc. The CTI server 80 then provides this information to the workstation 122 associated with the agent 120 who receives the call in order to assist the agent in handling the caller. For example if the incoming call 60 is to be routed to telephone 121B of agent 120B, then the CTI server accesses information about the caller from CRM database 70 and forwards this information to the corresponding workstation 122B.

Call centres having CTI such as shown in FIG. 1 have been around for many years. In many cases the system shown in FIG. 1 is internal to a particular organisation. In other words, switch 90 represents a PBX and telephone network 101 represents the internal telephone network of the organisation. Likewise computer network 102 represents the internal computer network (e.g. intranet) of the organisation. This configuration is sometimes referred to as CPE (customer premises equipment).

An alternative configuration, sometimes referred to as SPE (service provider equipment) involves locating CTI server 80 within the general telephone network, with switch 90 being a central office switch that forms part of the overall network run by a carrier. In this configuration, the telephone network 101 may be the public switch telephone network (PSTN) and the computer network 102 may be the Internet. There may be additional equipment (not shown in FIG. 1) to link workstations 122 to computer network 102 and/or telephones 121 to telephone network 101. For example, workstations 122 may be attached to an internal network, such as an Ethernet, which is then linked to computer network 102 by a router and firewall, while telephones 121 may be linked to telephone network 101 by an automatic call distribution (ACD) unit.

There are some drawbacks associated with the architecture of FIG. 1. For example, the CTI server 80 may be relatively expensive. In addition, it is necessary to provide the CTI server with access to the CRM database 70. Generally this requires the CTI server to be able to submit queries to the CRM database and to be able to understand the responses—e.g. by providing the CTI server with access to the database API. In practice, the majority of call centres in the UK do not have a CTI server; rather workstations 122 typically access the CRM database 70 directly, without using (or benefiting from) any telephony information acquired by switch 90.

WO 00/54485 discloses a system for administering call set-up in a telecommunications network. A web page stores call handling data for a caller in XML or some other predetermined format. Such a web page typically contains an identifier and title, a policy type and owner, and various rules. Upon connection of a call to a switch, the information associated with a call is converted to keywords for a search engine to locate the web page corresponding to the initiating caller, thereby allowing the call to be handled accordingly.

It is common for organisations to outsource CTI and/or call centre operations to a third party. This strategy may be adopted by very small organisations, which may only have one incoming telephone line, as well as by larger organisations. In some cases the third party may provide CTI services to assist the organisation in handling the call itself, while in other cases the third party may be responsible for complete handling of the call (i.e. the original organisation is not involved at all in handling the call).

One problem with a third party call centre model concerns the provision of access for the CTI service provider (i.e. the third party) to the CRM database of the client (i.e. the organisation on whose behalf the hosted telephone service is being provided). For example, the client may provide the CTI server with its own copy of the CRM database, but this copy may not always be up to date. In addition, the CTI server may now have to support access to potentially multiple different CRM database formats for multiple different clients, adding significantly to the cost and complexity of the CTI server itself. Furthermore certain CRM data may be unavailable to the service provider, which may in turn limit the functionality that the CTI server can provide.

Another difficulty is that smaller organisations may not have the capacity to maintain a proper CRM database. This has generally meant that such small clients have not been able to benefit from full CTI services.

SUMMARY OF THE INVENTION

Accordingly, one embodiment of the invention provides a method of providing computer-telephony integration. The method involves receiving an incoming call; obtaining telephony information relating to the call; performing a search with a search engine in relation to the obtained telephony information; and using results from the search in handling the call. The search results include heterogeneous material not primarily intended for call handling purposes.

The telephony information relating to the call may comprise information such as the calling number or information acquired via a telephone interface (e.g. an interactive voice response system). This telephony information is then used for a search which exploits data in heterogeneous material such as emails, web pages and/or word processor documents. Such material generally does not have any predetermined format or structure, and is not primarily intended for call handling purposes. However, the use of the telephony information for searching this material allows search results to be obtained from (i.e. comprise a portion of) this material which can then be used for handling the call.

As an example, the telephony information may comprise a calling telephone number. The search results may include an email containing that telephone number. The incoming call might then be forwarded to the recipient of this email.

This approach can be used on many different scales. For example, the search may be limited to a single desktop machine (especially if the call is initially directed to the user associated with that machine). In another embodiment, the search may be spread across material held within an organisation, for example by using an enterprise search engine which performs a search across multiple servers of the organisation. In another embodiment, the search is performed across the Internet.

The search results are used for directly determining an operation to be performed on the call. This may involve allocating a priority level to the call, allocating the call to a particular cue, directing the call to a particular recipient, using an interactive voice response system to play particular prompts or messages to the caller, and so on. The search results may also (or alternatively) be used to provide information to a person receiving the call, such as an agent in a call centre. In one particular implementation, the search results are used to determine an advertisement to be received by the calling party.

In some cases the raw search results are used for determining the call handling. In other cases, the raw search results may be processed or parsed to extract information from the search material for use in call handling (reflecting the fact that the material is not primarily designed for call handling).

In many cases, searches are obtained on a continuous basis. The results from these searches may then be indexed and cached, thereby allowing the system to use already stored material to determine the search results for an incoming call. The parsing of the search material may also be performed in advance of the incoming call itself.

Another embodiment of the invention provides an apparatus for providing computer-telephony integration comprising: a computer-telephony system for receiving an incoming call and obtaining telephony information relating to the call; and a search engine for performing a search in relation to the obtained telephony information; wherein the computer-telephony system is configured to use the results from the search in handling the incoming call. The results include heterogeneous material not primarily intended for call handling purposes.

Another embodiment of the invention provides a method of providing computer-telephony integration comprising: making an outgoing call; providing information relating to the call; performing a search with a search engine in relation to the provided information; and using results from the search in handling the call, wherein said results include heterogeneous material not primarily intended for call handling purposes.

Another embodiment of the invention provides apparatus for providing computer-telephony integration comprising: a computer-telephony system for making an outgoing call and for receiving information relating to the call; and a search engine for performing a search in relation to the received information; wherein the computer-telephony system is configured to use the results from the search in handling the call, wherein said results include heterogeneous material not primarily intended for call handling purposes.

It will be appreciated that the apparatus embodiment of the invention may benefit from the same preferred features as the method embodiment of the invention.

The present invention also provides a computer program for implementing a method as described above, and a computer readable medium, such as a DVD, flash memory, or hard disk, containing such a program.

BRIEF DESCRIPTION OF THE DRAWINGS

Various embodiments of the invention will now be described in detail by way of example only with reference to the following drawings.

DETAILED DESCRIPTION

Figure 1:
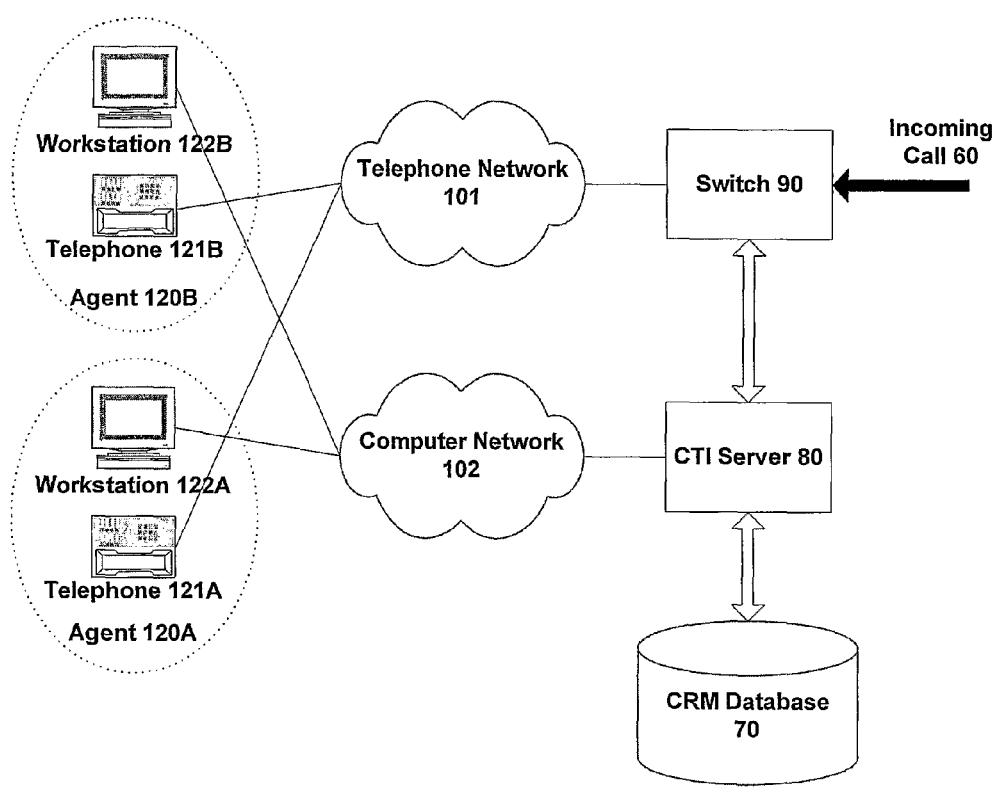
FIG. 1 is a schematic diagram of a known CTI system.
Figure 2:
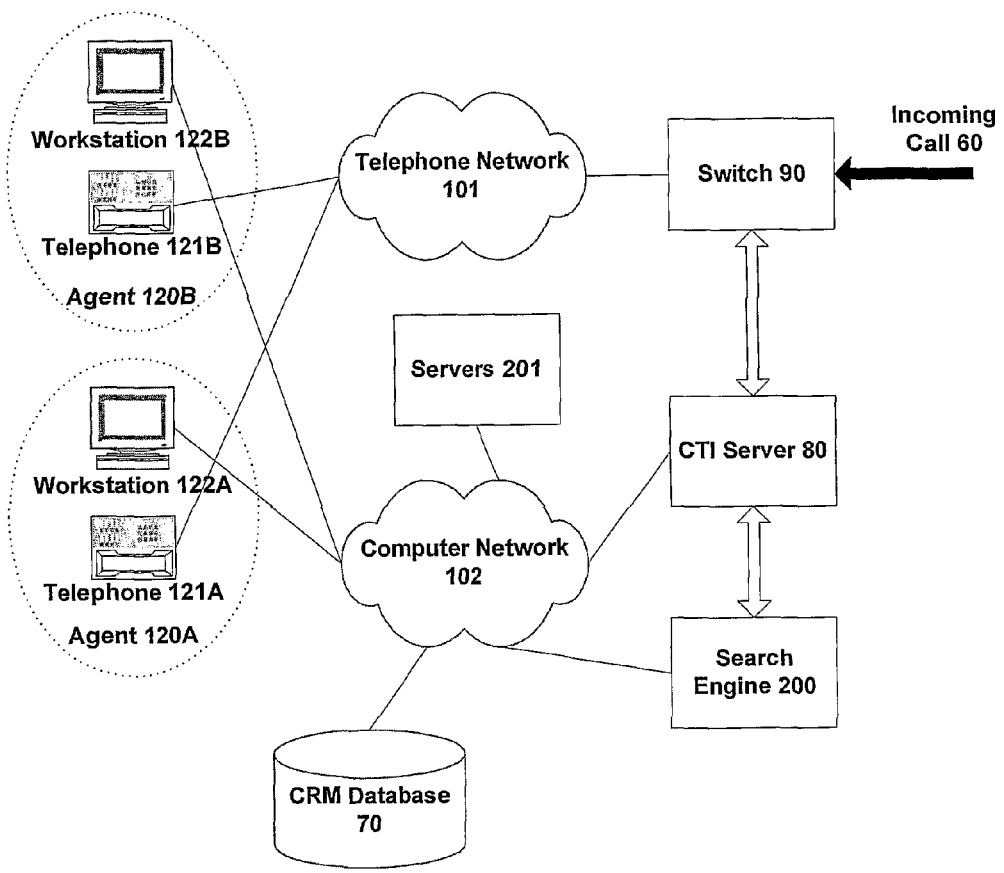
FIG. 2 is a schematic diagram of a CTI system in accordance with one embodiment of the invention.

FIG. 2 is an illustration of the CTI system in accordance with one embodiment of the invention. Components that are the same as existing systems such as shown in FIG. 1 will not be described further. In the system of FIG. 2, the CTI server 80 no longer accesses the CRM database 70 directly; indeed, in some implementations the CRM database 70 may be omitted altogether. Instead, the CTI server 80 is linked to a search engine 200 such as a Google enterprise server 200 (or any other appropriate form of search engine). The search engine 200 has access across computer network 102 to potentially many different servers 201 within the organisation, for example email servers and so on. The search engine 200 may also be connected to third party servers, such as web servers accessible over the Internet. The search engine may also be able to access CRM database 70 (if present), or alternatively CTI server 80 may itself directly access the CRM database 70 (as for FIG. 1).

Figure 3:
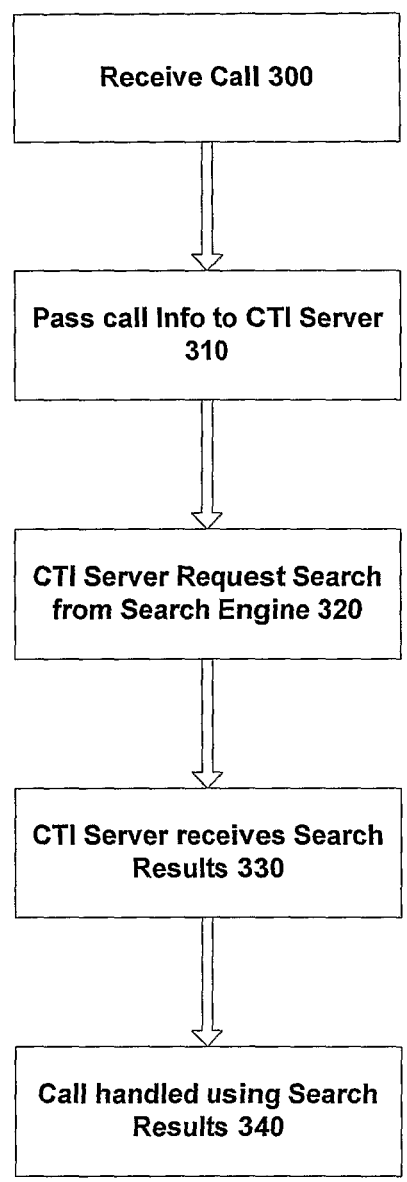
FIG. 3 is a flowchart of a method for operating the CTI system of FIG. 2 in accordance with one embodiment of the invention.

FIG. 3 is a flowchart showing in schematic form the operation of the system FIG. 2 in accordance with one embodiment of the invention. An incoming call is received (300). Information concerning the call is passed to the CTI server from the switch 90 (310), as already described in relation to FIG. 1. Most commonly the call information is obtained automatically by the switch 90, for example calling and/or called number. In some implementations, this call information this may be supplemented by information specifically acquired from the caller, for example using an interactive voice response (IVR) system (not shown in FIG. 2).

The CTI server now sends a request to the search engine based on the received CTI information (320) (rather than the CTI server itself performing a database lookup as in the operation of the system in FIG. 1). When the CTI server receives the search results back from the search engine (330), the CTI server 80 can use the received search results to perform appropriate call handling (340). This call handling may for example involve directing the call to a particular agent and his/her telephone 121 based on the search engine results and/or providing information from the search engine results as a screen pop or similar onto the workstation of the agent who is about to receive the call.

Although the processing of FIG. 3 is depicted as a simple sequence of steps, more complicated scenarios are possible. For example, the CTI server may initially try to obtain information itself from the CRM database 70, as for FIG. 1. In this case the CTI server may only make a search request at operation 330 if the information available from the CRM database is insufficient for call handling. For example, if an incoming calling number is not present in the CRM database, the CTI server may request the search engine to locate the telephone number, such as on a web page and/or in an email. If the CTI server can then find a name associated with the telephone number (either for an individual or a company), the CTI server may then return to the CRM database to try to find this name in the CRM database for further call handling.

Another possibility is that if the information obtained by the CTI server 80 is regarded as insufficient for call handling purpose, the CTI server may ask the switch (or other relevant apparatus) to acquire further information from the caller, for example using an IVR as mentioned above. This further information may then be used as the basis for (another) search by search engine 200.

It will be appreciated therefore that there are multiple different routes for CTI server 80 to acquire information, for example from an IVR, a CRM database 70, and/or search engine 200. Depending on the particular application and circumstances, the CTI server 80 may exercise these different routes sequentially or in parallel (or via some combination of the two), iteratively, conditionally, and so on. For example, information about a caller retrieved from the CRM database might be used as the basis for a search by search engine 200; conversely, information found from the search might be used to help identify a caller record in the CRM database.

In contrast to the configuration of FIG. 1, where the CTI server performs a database lookup for a specific, formatted record for the caller, or indeed the approach of WO 2005/017773, in which the search engine locates a specific formatted web page for the caller, the search engine 200 of FIG. 2 adopts a very different approach. In particular, the search engine 200 is not trying to locate predetermined call handling data stored in a single formatted record or web page. Rather, based on the call details (such as calling number), the search engine 200 retrieves information of potential relevance to call handling across the search domain.

The retrieved information may be distributed across multiple documents forming a heterogeneous collection of generic material, such as emails, web sites, internal company documents (e.g. Word files), and so on. Note that this material was not originally intended, designed or created for CTI call handling purposes, and so does not directly instruct the CTI server 80 how to process the call; rather the CTI server (or other system) has to infer how to process the call from an analysis of the material retrieved by the search.

Search engine 200 has access to a potentially much wider range of data than the conventional CTI system shown in FIG. 1 (which is limited to the contents of CRM database 70). For example, a CRM database 70 may only contain information about existing customers, whereas search engine 200 can look for information about callers who are not existing customers (and hence might represent potential new customers). Search engine 200 can also retrieve a much broader range of material that would normally be stored in CRM database 70, for example emails that the customer has previously sent into the organisation. This information can greatly improve handling of the call.

Furthermore, search engines are widely deployed for general information retrieval. Consequently, a search engine such as shown in FIG. 2 can be readily obtained by an organisation (if not already available within the organisation), and moreover can be installed and maintained by general IT staff, without requiring specialist skills in CTI or CRM database technology. In addition, search engine 200 generally accepts input search strings in the format of basic text (this can be regarded as a very simple and standardised form of API). Thus in some embodiments, CTI server avoids having to support formalised database queries into CRM database 70, which therefore reduces the burden and complexity of the CTI server 80. Accordingly, the upfront and running costs of the configuration of FIG. 2 are very competitive.

It will be appreciated that in many cases the search engine 200 performs a continuous (or regular) process of searching servers 201, etc. The search engine indexes and/or caches the results of this ongoing searching for use in responding to future search requests. Thus in response to a request from the CTI server at operation 320, the search engine may already have results available based on the index information and/or cached data, rather than having to perform a new search of servers 201, etc in response to each incoming request. The results may be returned to the CTI server either as the materials themselves or as links to the relevant materials (e.g. URLs).

Note that the indexing (and potentially the advanced caching) may be customised for the CTI integration. For example, the indexing may be performed by telephone number. Additional searching could also be performed in advance. For example, the system could search for any telephone numbers in internal documents for an organisation. For each telephone number located, it could look at which employee name is associated most frequently (or most recently) with each telephone number. This then gives a mapping of telephone numbers to employees which can be used for the routing of future incoming calls.

Figure 4:
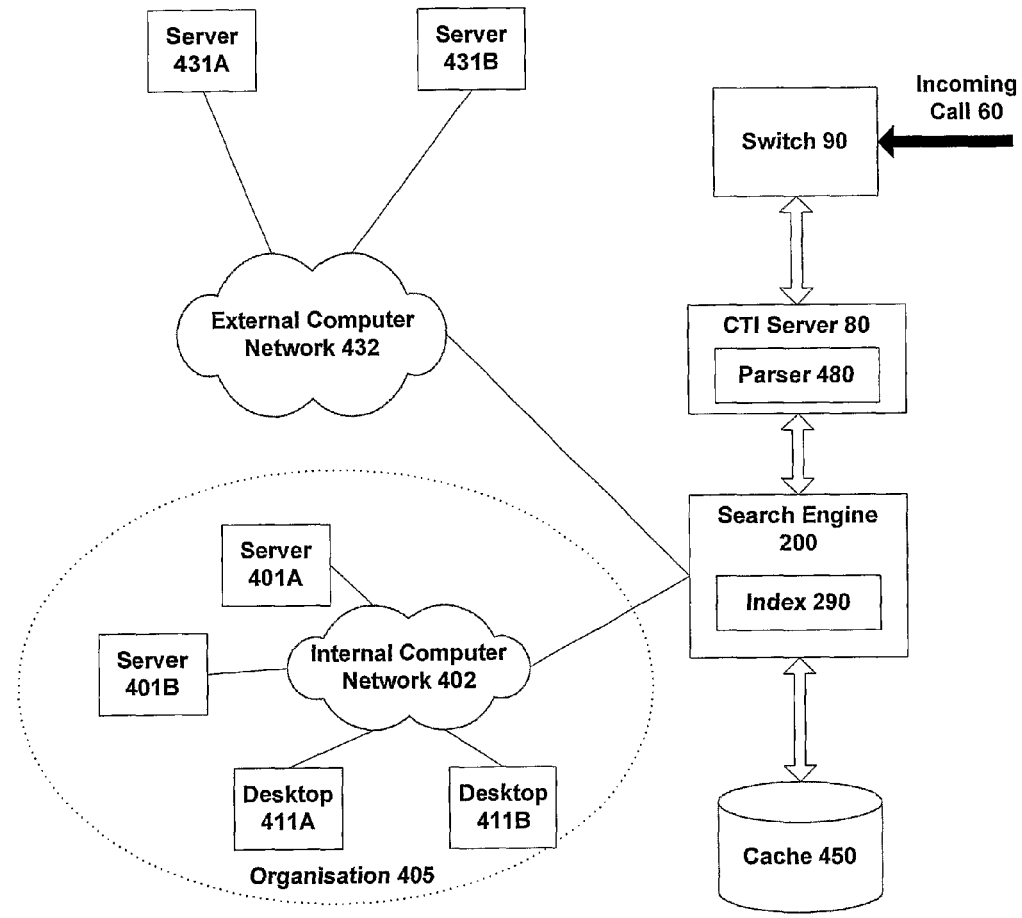
FIG. 4 is a schematic diagram indicating the potential search domain for use in the embodiment of FIG. 2.

FIG. 4 is a schematic illustration of a system architecture with computer-telephony integration and a search engine in accordance with one embodiment of the invention. Note that FIG. 4 is intended to focus on different aspects of the architecture from FIG. 2; the embodiment of FIG. 4 can therefore be seen as complementary (rather than an alternative) to the embodiment of FIG. 2. In particular, FIG. 4 is primarily concerned with the operations and interactions of search engine 200, and hence for clarity omits some of the telephony components that are shown (for example) in FIG. 2.

Thus as shown in FIG. 4, search engine 200 is connected to both an internal computer network 402 (intranet) for an organisation 405 and also to an external computer network 432 (extranet or the internet). Note that while switch 90, CTI server 80, search engine 200 and cache 450 are shown as external to the organisation 405, one or more of these components may be internal to the organisation, depending upon the particular implementation adopted. For example, in some implementations, search engine 200 may be an internal search engine run by a particular organisation, while in other implementations, it may be a general search engine 200 accessed over the Internet (such as www.google.com or www.altavista.com).

The information that might be searched by search engine 200 over network 432 includes the following:

general material publicly available on the web, including pages for individuals (private and business), companies, and other organisations reference material publicly available on the web, including official sites, such as http://www.companieshouse.gov.uk/, which provides basic information for all companies registered in the UK, along with other directories, etc restricted material available from an information supplier such as Dun and Bradstreet over a public network restricted material available over a public network to members of a particular grouping, e.g. an industry trade body, or a social or professional network such as LinkedIn The restricted material may be subject to a possible payment, subscription, registration, password protection etc, which can be provided to the search engine 200 for access.

The information that might be searched by search engine 200 over network 402 includes the following:

information on individual desktop machines 411, including word processor files, presentations, spreadsheets and emails information on servers 401, including intranet files, emails, document management systems, backup and archived material, database files It will be appreciated that the search domain for search engine 200 may be different for different implementations. For example, in some implementations, search engine may only search computers within organisation 405, and not look for information over any external network. In addition, the search domain may be specific for a particular call. For example, an incoming call may have a direct dial number to the extension of a particular user. The search engine may then search the desktop machine 411 associated with that particular user to find information for handling the call.

In the embodiment of FIG. 4, search engine 200 has an associated index 290 and cache 450. These can be used in conventional fashion to assist the operations of search engine 200. Thus index 290 maps search terms to material containing those terms to provide fast search retrieval, while cache 450 contains copies of at least some material accessible to search engine 200. It will be appreciated that both cache 450 and index 290 are generally populated by performing ongoing searches using a spider or similar tool, thereby ensuring that results are rapidly available for newly received searches.

The CTI server 80 of FIG. 4 includes a parser 480 (note that in some implementations parser 480 may be a separate machine, or part of search engine 200). The role of the parser is to extract automatically useful information from the material retrieved by search engine 200. For example, if the search string is based on the calling telephone number of an incoming call, parser 480 can try to identify a post (zip) code in the documents found by search engine 200. This identification may take into consideration factors such as the known format of a post code, the proximity of a post code in a retrieved document to the calling telephone number, the number of retrieved documents that contain the same post code associated with the calling telephone number and so on. (Although there are commercially available databases that map calling line ID to postcode, but these are not always complete, and do not assist with non-geographic numbers). Note that the parser 480 may also be operated on a continuous basis across the search domain of search engine 200, and the results stored (cached), so that they are rapidly available for an incoming call.

As a specific example of the above processing, an organisation may receive a call from a mobile telephone (or other non-geographic number). The mobile telephone might be used by a person running a home business with a web site that lists both the mobile telephone number and the address of the business. The parser can then extract the postcode from this web site and use this information to determine how best to handle the call. For example, the call might be directed for handling to a particular branch office of the organisation close to the business address, or an agent handling the call may be prompted with information concerning the store nearest to the assumed location of the caller.

Figure 5:
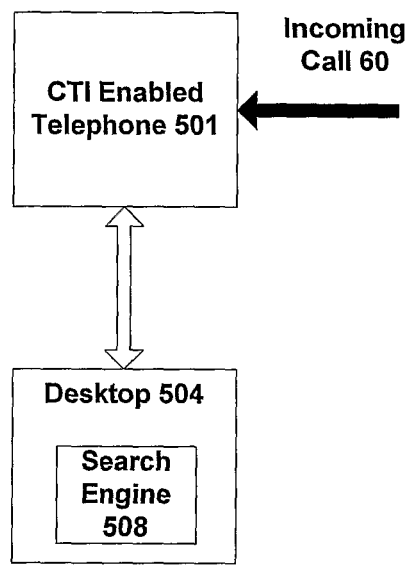
FIG. 5 is a schematic diagram of a CTI system in accordance with another embodiment of the invention.

FIG. 5 illustrates another embodiment of the invention in which a user or agent is provided with a desktop 504 system (e.g. a personal computer) that includes a search engine 508, such as Google desktop or some other similar system. The user of the system of FIG. 4 is also provided with a CTI enabled telephone 501, in other words, a telephone that can notify a linked PC (i.e. desktop 504) that the telephone has received an incoming call and can provide some pertinent information about the call (such as the calling line identifier). Note that in other embodiments, the user may have a conventional telephone, and desktop 504 then receives CTI information from a CTI server using an architecture similar to that shown in FIGS. 1 and 2.

The information received from the CTI enabled telephone 501 is used to form a search query which is then entered into the search engine 508. The scope of this search depends on the configuration of the search engine 508. For example, the search may be limited to files on desktop 504, or may extend to various network services accessible to desktop 504 (e.g. a file and/or email server).

As an example of the operation of the system of FIG. 5, the desktop system may receive from telephone 501 the telephone number of the caller for incoming call 60. This telephone number is then entered as a search string into search engine 508 which searches a variety of data, such as saved word files, emails, etc for this string. (As explained in relation to FIG. 3, this search may be performed in direct response to the request, or may utilise index and/or cached materials from previous searching). For example, this search may identify one or more emails containing this telephone number, which may well have been received from the person making the call. Accordingly, the results from the search engine contain links to these emails and any other materials that match the search string. The search results including associated links can then be displayed to the person receiving the call, thereby allowing the relevant materials to be readily accessed in order to assist handling the incoming call 60.

It will be appreciated that the approach of FIG. 5 is extremely flexible and powerful. In addition, it can be readily used by very small organisations since the only additional functionality involved (for a person who already uses Google desktop or similar) is to receive the CTI information from telephone 501 and to enter this information into search engine 508, with the results from the search then being displayed automatically to the user. Accordingly, the embodiment of FIG. 5 embodiment provides a very flexible and low-cost introduction to CTI facilities.

The desktop configuration of FIG. 5 can also be applied to larger systems with many agents (as shown in FIG. 2), where each workstation 122 may be provided with its own search engine (rather than having a single shared search engine such as shown in FIG. 2). In this distributed approach, when the switch forwards an incoming call to the telephone of a selected agent, it also provides the corresponding workstation with the information for forming the search query. Such an architecture provides CTI information despite only very limited support from the switch (the switch may do no more than forward basic call information to a workstation associated with a telephone that is to receive the call).

One possible situation is where the switch supports direct dial to different telephone extensions 121A, 121B. In this case, the search domain may be limited to (or start with) material associated with the particular user corresponding to the dialed extension. This material may comprise, for example, files stored on a computer associated with that user, and/or files owned by that user and stored centrally.

The configuration of FIG. 5 may also be readily adopted in respect of Internet telephone systems such as Skype, Vonage, or other systems that adhere to the session initiation protocol (SIP) for voice over Internet (VOIP) calls (see http://www.voip-info.org/wiki/ for more details of Internet telephone systems). In such a configuration, the incoming call 60 is received in effect directly into desktop machine 504 over the Internet or other computer network (rather than being received over a dedicated telephony network such as the PSTN). Accordingly, the desktop machine 504 has immediate access to information about the call for use in formulating a search query for search engine 508.

Note that if an incoming call is received from a VOIP system (whether into another VOIP system or a conventional telephone network), then the information about that call may be somewhat different from that available for an incoming call over the conventional PSTN. For example, the call information might represent a name, user id, network address, and so on. Nevertheless, this call information can still be used as the basis for a search engine query to obtain additional information for call handling purposes.

It will be appreciated from the various embodiments so far described that the present invention can be adopted in a wide variety of configurations. For example, search technology may be integrated into a CTI systems including call centres, whether network-based (SPE) or customer-based (CPE), carrier network operations (landline, mobile, Internet, etc), systems based on desktop machines (such as shown in FIG. 5), whether in standalone mode or connected to a remote CTI system. The search engine and search domain can be adjusted to the particular configuration and application. For example, the search engine may be based on any type of system, from a desktop machine (such as shown in FIG. 5) through to a high-powered server (or cluster of servers), depending on the number of calls to be handled. Likewise, the search domain may represent a single computer, a single computer network (e.g. a local area network), an enterprise network, or a public network, such as the Internet, etc.

The results of the search can be used to control one or more different aspects of call handling. Such aspects may include the direct treatment of the call, such as the priority given to the call, who the call is forwarded to, how to process the call if the intended recipient is not available, and so on.

The results of the search can also be provided, for example as a screen pop, to a person involved in handling the call, such as a receptionist (who may then route the call with or without first answering the call), an agent who receives the call, or any other person who answers the call. The results of the search can also be used to determine whether the call is directed to an automated IVR system to acquire and/or play additional information from/to the caller, as well as the treatment of the caller by the IVR, e.g. what menus to offer the caller.

In one embodiment, the results of the search may be used to decide advertising or marketing to a caller. For example, a wholesaler for automobile parts may receive a call, and the search information based on the caller information indicates that the caller is a tyre fitter. The caller may then be played an advert for a particular brand of tyre before (e.g. while waiting for) connection to a service operative of the wholesaler. If the caller is calling from a mobile telephone (or an Internet telephone), the advert may also (or alternatively) be sent directly to the caller, for example, as a screen pop. Advertising in this manner can provide revenue to the wholesaler and/or to the provider of telephony services for the wholesaler.

The telephony information in the search request (to search engine 200 or 408) may comprise the calling line identification, the dialed number identification, or perhaps other information entered by the caller into an IVR system, such as account number etc. This information can be supplemented in the search request by other wording to improve the search results. There are many possibilities for this additional wording, such as the following examples:

a) search for telephony information+a term such as "name" or "address". This may increase the chances of pulling up additional useful information (such as name and/or address) relating to the caller. The agent handling the call may then be able to confirm that a retrieved name and/or address is correct for the caller, and may then be able to transfer this information into CRM database 70 (if not already present). Note that this is a much more caller-friendly and less error-prone process than having to acquire the address from the caller himself/herself for entry into the computer systems of the organisation.

b) search for telephony information plus names of individuals within an organisation. For example, if the telephony information is found in combination with a name plus a title of "managing director" or "CEO" this may indicate a more important caller.

c) search for telephony information plus particular promotion names e.g.—gold customer, since this may also affect how the call is handled.

d) search for telephony information plus a term such as "sales" where subsequent processing might test any numerical values returned to try to assess the importance of the customer.

Note that in some cases the additional search terminology may be dependent on the telephony information. For example, the name of the town corresponding to the area code of the incoming call may be used to search for an address—e.g. if the incoming call is from a UK area code of 02380, it may be appropriate to include "Southampton" in the search terms.

The number of hits for a given search combination may also be significant for deciding how to handle an incoming call. For example, the more times that the name of the CEO is found in conjunction with the caller information, the more important the caller is assumed to be and the higher the call priority (e.g. it may be directed to a more senior person).

In addition, the search request may represent multiple individual searches, which may be performed in parallel or in succession. In the latter case, the later searches may be conditional or dependent on the results of the earlier searches. For example, multiple searches could be performed in parallel, each combining the incoming telephone information with the name of a different person in an organisation to see who is most appropriate to answer the call (e.g. based on which combination gets most hits). Another possibility would be to perform a first search to find a company name associated with a calling telephone number. A second search might then be performed to locate information associated with that company, such as financial reports, news items, etc.

In one implementation the CTI server passes the raw search results to the person (e.g. a call centre agent) handling the call as information potentially relevant to the call. This avoids the CTI server having to be able to interpret (parse) the search results at all.

In another implementation, the CTI server may utilise the search results itself, for example in determining where the call should be routed such as by performing a search in combination with one or more names, as discussed above. In this embodiment, the CTI server (or some other system such as parser 480) processes the search results from the search engine. This capability to process the search results may be involve counting the number of hits, or may include some ability to interpret the received data, for example to detect a name or address in the text.

As previously mentioned, the input to the search engine is generally in a simple text format. Likewise, the results from the search engine are generally presented in a standard format of links (e.g. URLs or URIs) to the relevant material, or as the documents themselves. Thus unlike with CRM database 70, where every organisation may have its own database format, the results from search engine 200 are generally presented in a much more consistent format. This avoids (for example) a CTI supplier having to write a different front end to parser 480 for each different organisation.

Note that although the links (URIs) are generally presented as standard text strings, they may link to any form of content such as audio, images, video, etc. In some cases, the search engine may locate this material based on ancillary data (metadata), such as file name, etc. In other cases the search engine may be able to work directly with different forms of content, such as performing speech recognition on audio data. (There is a lot of current research concerning the automatic classification of images).

As an example of this approach, a call centre for a clothing retailer may try to access an image of a caller—e.g. by locating a facial or body image on the same web page as the name of the caller. This would then suggest the age and size of the caller, which might in turn indicate the type of clothing products of most interest to them. The accuracy of this approach could be enhanced by comparing images from different web sites having the caller name (e.g. home and work sites) and looking for a match.

Table 1 illustrates the results from a search based on a calling number, 02380719500, on the site www.google.co.uk:

TABLE 1

D Young & Co in Southampton - Unclassified in Southampton - Touch ...
D Young & Co. User reviews (0) 02380719500 Briton House 10-12 Briton Street,
Southampton, Hampshire, SO14 3EB. Try other:, Unclassified in Southampton ...
www.touchsouthampton.com/business/list/bid/4240074 - 39k - Supplemental Result -
Cached - Similar pages
123Bang.com
D Young & Co. Patent Agents. Address: 10-12, Briton House, Briton Street, Southampton,
SO14 3EB, UK Telephone: 02380719500 ...
www.123bang.com/localsearch.php?m=1&tid=64&cid=2831 - 12k - Supplemental Result -
Cached - Similar pages If an organisation such as a bank receives a call from this number, the agent who receives the call can immediately identify the name of the caller, the address of the caller, and also the business of the caller from the search results. The search could be extended further by using the company name (readily identified automatically at the start of the above two entries) as another search string, which on www.google.co.uk then brings up as the first hit as shown in Table 2:

TABLE 2

D Young & Co
UK European patent attorneys D Young & Co. Chartered, registered
attorney for patents, trademarks, patents, trademarks, design,
community trademark ...
www.dyoung.com/ - 11k - Cached - Similar pages This is the main web site for D Young & Co and provides the agent with ready access to further information about the caller.

Figure 6:
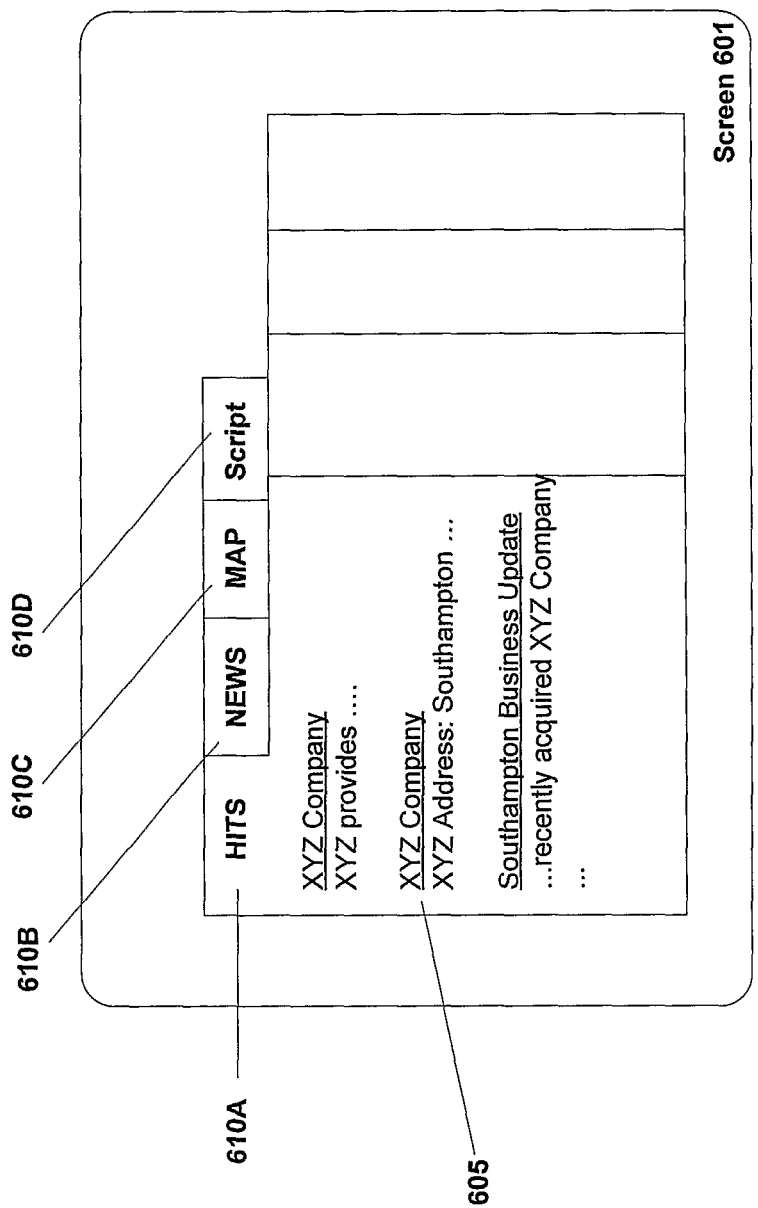
FIG. 6 is a schematic illustration of an agent screen produced by the CTI system of FIG. 2 in accordance with one embodiment of the invention.

FIG. 6 illustrates a screen 601 provided to an agent who receives an incoming telephone call in accordance with one embodiment of the invention. The screen includes various tabs 610A, 610B, etc, each providing different information to the agent. Clicking on a particular tab brings the information associated with that tab to the foreground. It will be appreciated that the tabs shown in FIG. 6 are by way of illustration only, and other implementations may have different tabs (or some other form of user interface).

One of the tabs 610D shown in FIG. 6 provides a script for the agent to use in handling the call (such scripts are conventional in call centre applications). The remaining tabs provide additional material which may be obtained from searches based on the caller information in accordance with one embodiment of the invention. This additional material may help the agent to interact with the called party at a more individual, and hence more successful, level.

Tab 610A is currently in the foreground and provides a listing 605 search results (hits) from the caller information (similar to that shown in Table 1 above). Note that if there are too many hits for display within a single screen, a facility can be provided to scroll or page down to additional hits in conventional fashion. In this particular embodiment, the hits are presented as live links, so that by clicking on a desired search result, the user is taken directly to the corresponding material. (In some cases the user may be presented with a choice of going to the original material or a cached version for speed).

Tab 610B provides a similar listing to tab 610A, but is limited to news items. This corresponds to a service available on certain search engines, such as Google, in which the search domain is limited to news material (rather than all material available on the web). Search engines may offer other limitations of domain that might be presented on other tabs. For example, Google offers the "Froogle" service, in which the search domain is limited to advertisers.

Tab 610C takes a location and plots a map for this location using Google maps or any other available mapping tool. The location can be determined by parsing search data such as shown in Table 2 and extracting a post code. Alternatively, the location might be obtained using existing data sets for directly converting telephone numbers to locations. The map may be augmented with information pertinent to the person handling the call. For example, if the call is received at a pizza outlet, the map may indicate the delivery area for the outlet, or if the call is received at a council education office, the map may indicate the locations and catchment areas for schools.

The ordering of the hits in listing 605 corresponds to the ordering produced by the search engine. This in turn is generally based on relevance, which may calculated from a variety of factors such as prominence of the search terms, number of links to the relevant material, age of material, and so on. The type of material can also be used as an indicator of importance or relevance. For example, recent emails might be treated as a primary source of information, recent local files as a secondary source of information, and public material (e.g. the Internet) as a further source of information. As noted above, in some embodiments the search domain may be restricted to only certain information sources, depending upon the application and circumstances. In some embodiments, the information from different sources may be presented in a single ordering of relevance, while in other embodiments, hits from different sources may be presented on different tabs, so that one tab might be for email hits, one tab might be for hits from local files, one tab might be for hits from files across the enterprise, and so on.

In one particular embodiment, a database is used to store a record of incoming calls, and this database also tracks any links or material used in processing the call. This material may then be given an increased relevance for handling future calls (perhaps from the same organisation or calling number).

Although the invention has primarily been described in the context of inbound calls, it may also be applied in the context of outbound calls. For example, a call centre may make outbound marketing or customer survey calls to a given telephone number. The agent handling the call may be provided with a screen similar to that of FIG. 6 for handling the call, so that the agent is provided with additional material such as shown on the tabs for "Hits", "News" and "Map" to supplement the standard script. As for inbound applications, this additional material may help the agent to interact with the called party at a more individual, and hence more successful, level.

In another outbound embodiment, a caller makes a call using speech recognition by speaking the desired target of the call (this may be a person or an organisation). The search engine can then search for the name and/or number of the target. The data to be searched might include: phone numbers from private directories; phone numbers from enterprise directories; phone numbers from Yellow Pages or White Pages; phone numbers from web sites; phone numbers from emails; and so on. The caller may also be provided with other information of potential relevance to the call. For example, if the target is a particular organisation, e.g. a supplier, the caller might be provided with current order details from that supplier.

The skilled person will be aware of a range of possible modifications of the various embodiments described above. Accordingly, the scope of the present invention is not limited to these particular embodiments, but rather is defined by the appended claims and their equivalents.

The invention claimed is:

1. A method of providing computer-telephony integration comprising:
   receiving by a computer-telephony system an incoming call;
   obtaining by the computer-telephony system telephony information relating to the call;
   sending a plain text search request by the computer-telephony system to a web-based non-relational public search engine to perform a search based at least on an element of the obtained telephony information;
   receiving a set of relevance-ranked search results from the non-relational search engine;
   routing the incoming call by the computer-telephony system to a contact center agent based at least in part of the relevance-ranked search results, and
   using the relevance-ranked search results to provide information to the agent receiving the call via a screen pop agent and to determine an advertisement to be delivered via the call to at least one participant of the call.

2. The method of claim 1, wherein said search has a domain of material held within an organisation.

3. The method of claim 1, wherein said search is performed across the Internet.

4. The method of claim 1, wherein the web-based public search engine uses the calling telephone number as a search string.

5. The method of claim 1, wherein two or more searches are performed in respect of the incoming call.

6. The method of claim 1, wherein the search results are obtained on the basis of stored material.

7. The method of claim 1, wherein the search results are used to provide map information.

* * * * *